United States Patent [19]

Kramb

[11] Patent Number: 4,593,748
[45] Date of Patent: Jun. 10, 1986

[54] PROCESS FOR THE CLEANING OF HEAT EXCHANGERS FOR EXHAUST GASES FROM ENGINES

[75] Inventor: Jan Kramb, Simmern, Fed. Rep. of Germany

[73] Assignee: Kramb Mothermik KG, Simmern, Fed. Rep. of Germany

[21] Appl. No.: 633,183
[22] PCT Filed: Nov. 18, 1983
[86] PCT No.: PCT/EP83/00309
    § 371 Date: Jul. 16, 1984
    § 102(e) Date: Jul. 16, 1984
[87] PCT Pub. No.: WO84/02181
    PCT Pub. Date: Jun. 7, 1984

[30] Foreign Application Priority Data

Nov. 22, 1982 [DE] Fed. Rep. of Germany ....... 3243114
Jul. 18, 1983 [DE] Fed. Rep. of Germany ....... 3325872

[51] Int. Cl.$^4$ ............................................. F28G 13/00
[52] U.S. Cl. .......................................... 165/1; 60/320; 165/51; 165/95; 165/103
[58] Field of Search ................... 165/95, 39, 40, 103, 165/51, 84, 1; 60/320, 321

[56] References Cited

U.S. PATENT DOCUMENTS 3,818,975  6/1974  Tokumitsu et al. ..................... 165/1
4,509,589  4/1985  Carlson et al. ......................... 165/95

FOREIGN PATENT DOCUMENTS 0079033  11/1982  European Pat. Off. .
1097461  1/1961   Fed. Rep. of Germany .
3140113  4/1983   Fed. Rep. of Germany .
 849053  9/1960   United Kingdom .
 926510  5/1982   U.S.S.R. ................................ 165/95

Primary Examiner—Sheldon J. Richter
Attorney, Agent, or Firm—Wenderoth, Lind & Ponack

[57] ABSTRACT

The efficiency of heat exchangers for cooling exhaust gases from internal combustion engines of stationary plants for the operation of heat pumps or for the combined generation of current and heat, and for the cleaning of the heat exchangers is increased. The heat exchanger, after a liquid secondary heat transfer medium is emptied therefrom, or with the circulation of a gaseous secondary heat transfer medium cut off, is periodically heated by the hot exhaust gases to a temperature which is sufficient for the automatic cleaning of the heat exchanger surfaces.

17 Claims, 4 Drawing Figures

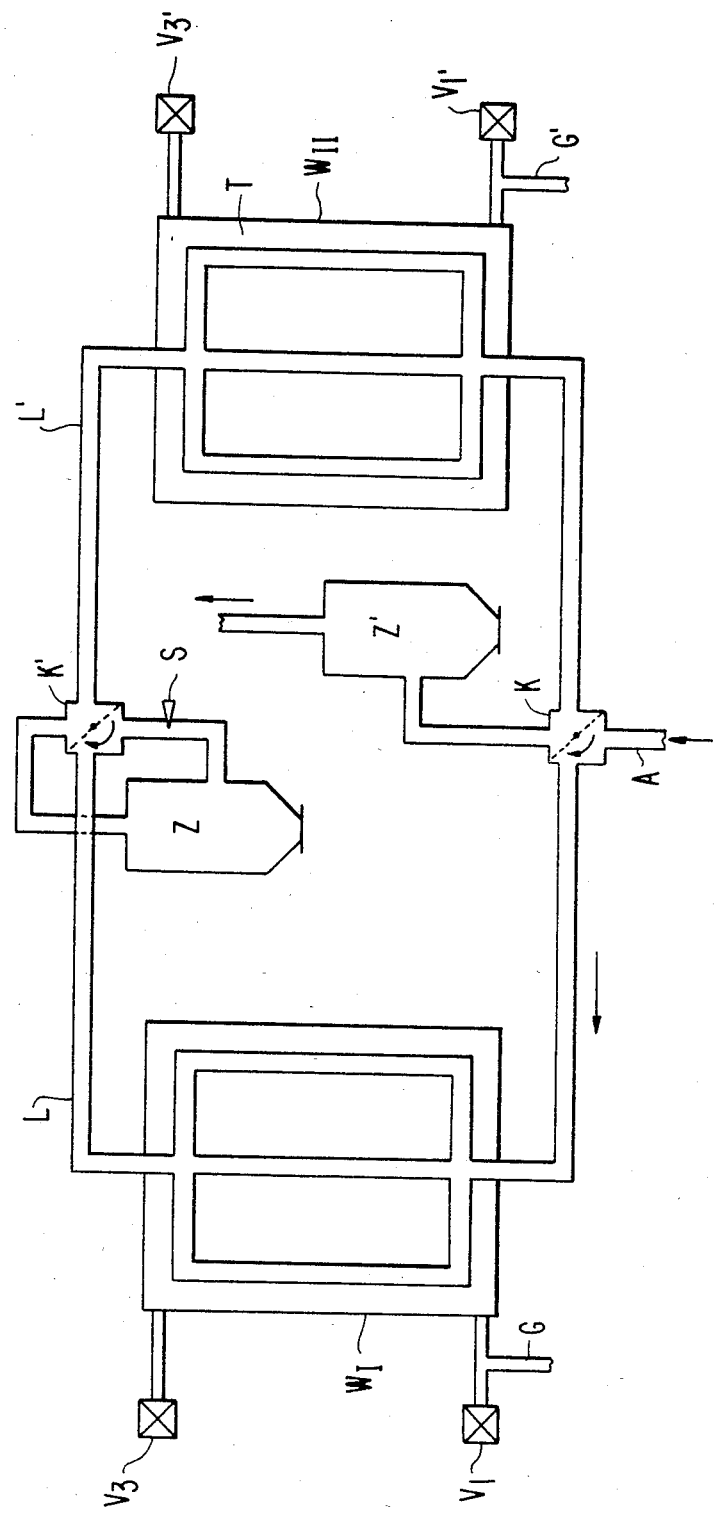

PROCESS FOR THE CLEANING OF HEAT EXCHANGERS FOR EXHAUST GASES FROM ENGINES

TECHNOLOGICAL BACKGROUND OF THE INVENTION

The invention relates to a process for increasing the efficiency or for the cleaning of heat exchangers used for exhaust cooling gases from internal combustion engines of stationary plants or installations for the operation of heat pumps or for the combined generation of current and heat.

STATE OF THE ART

A process for the removal of sediments from oil-fired furnaces is known from British Pat. No. 849 053 in which the hot exhaust gases are passed through a heat exchanger and the removal of deposits, particularly sulphurous deposits on the primary heat exchanger surfaces, can be improved by heating these heat exchanger surfaces to an elevated temperature by cutting off the secondary, gaseous heat transfer medium with the object of drying the deposits. By drying the deposits on the primary side, their removal by washing with water is presumed to be facilitated. This British Pat. No. 849 053 149 mentions 149° C. (300° F.) as the maximum temperature.

Heat exchangers are understood to mean heat exchangers with stationary heat exchanger conduits for a primary and a secondary heat transfer medium in which either medium comes into contact with one side of the conduit wall.

In stationary plants for the operation of heat pumps or for the combined generation of current and heat which use internal combustion engines for the drive, it is common practice to fully exploit the heat generated automatically in addition to the mechanical power for the operation of the heat pump or of the generator for producing the electric current. In this case, it is relatively easy to eliminate the heat generated in the internal combustion engine, since usually such internal combustion engines are water-cooled internal combustion engines. However, even in air-cooled internal combustion engines it is possible without further provisions to deliver the heat generated by the engine to a heating system, say, by means of a hot-water reservoir acting as a buffer tank. However, a considerable amount of the energy fed to the engine with the fuels is still contained in the exhaust gases; this part is on the order of 25 to 35% of the amount of energy fed by the fuel. Therefore, for a cost-effective operation it is practically indispensable to use the heat still contained in the exhaust gases for heating purposes or for preparing hot water. These exhaust gases are therefore passed through heat exchangers in order to fully exploit the useful heat contained therein.

If such stationary plants are operated with liquid fuels, and in particular with diesel or heating oil or even with mixtures of heating oil, diesel oil and properly processed old oil, sediments will over time be deposited on the heat exchanger surfaces, that is to say, soot particles contained in the exhaust gas from the internal combustion engines will be deposited on the walls of the heat exchanger. If a heat exchanger is involved that is very active and in which the dew point of the exhaust gases from the internal combustion engine is still not reached, there will further be formed on the heat exchanger surfaces a condensate to which these soot particles will also adhere. During operation, only superelevated temperatures could prevent such condensate from forming, but this would deleteriously affect the overall efficiency of such a stationary plant for the operation of heat pumps or for combined current and heat generation. Depending on the fuel employed for the internal combustion engine, such a condensate that precipitates on the heat exchanger surfaces consists of a diluted solution of a sulphurous acid and/or sulphuric acid. Furthermore, in addition to soot, ash particles contained in the exhaust gas can also be deposited on the heat exchanger surfaces. Therefore, in those areas of the heat exchanger where the dew point is not reached, a slimy pulp of soot, ash, water and said acids is formed, with the possibility that the latter may also corrode the heat exchanger surfaces.

These phenomena will cause the pipe walls of the heat exchanger to be slowly coated with condensation or to be provided with an encrustation, so that the efficiency of the heat exchanger for cooling the exhaust gases and, thereby, the overall efficiency of such a plant become impaired. Another drawback is that in the case of heavy encrustation or deposits, the flow resistances in the heat exchanger can increase in such a way that the internal combustion engine can no longer operate properly because of a backflow since with increasing backflow the mechanical efficiency of the engine is reduced by a deteriorating volumetric efficiency.

The heat exchangers for cooling exhaust gases can both be gas/exhaust gas and liquid/exhaust gas heaters wherein, if liquids are used as the secondary heat transfer medium, water is the liquid most commonly employed.

In these types of heat exchangers, the phenomena described earlier occur, but in the case of liquid/exhaust gas heat exchangers they are particularly unpleasant.

SUMMARY OF THE INVENTION

Therefore, the major object of the present invention is to create a process for increasing the efficiency or for the cleaning of heat exchangers for cooling exhaust gases that enables a continuous operation with few maintenance operations.

To accomplish this objective, use is made of the process incorporating the invention which is characterized by the fact that the heat exchanger, after the emptying of a liquid secondary heat transfer medium or with the circulation of a gaseous secondary heat transfer cut off, is heated periodically by the hot exhaust gases to a temperature which is sufficient for the automatic cleaning of the heat exchanger surfaces.

According to preferred embodiments, the process of the invention is carried out periodically a predetermined, freely selectable number times by means of an automatic control unit. Thus, it is possible to select appropriate times for the cleaning operation, e.g. periods during which there is no excessively great heat demand for the amount of heat required, but a fairly great demand for mechanical power output, i.e. power output for the heat pump or for an electric generator.

According to another preferred embodiment, the process of the invention is carried out according to freely selectable operating periods of the internal combustion engine by means of an automatic control unit. This has the advantage that excessive contamination and, thereby, a lowering of the efficiency of the exhaust gas heat exchanger can be avoided with assurance in the event the plant is not continuously serviced by an operating staff, but is largely controlled automatically.

In yet another preferred embodiment, the process embodying the invention is invariably carried out when a preselected temperature limit for the exhaust gases emerging from the heat exchanger is reached, the process in this case also being carried out advantageously by means of an automatic control unit.

In still another embodiment, the process is carried out at times when there is a great demand for mechanical power output of the internal combustion engine, but with little demand for the amount of heat required, in which case it is advantageously carried out by means of an automatic control unit.

If the exhaust gas heat exchanger is very heavily contaminated, that is, particularly if there are heavy soot deposits, it has been found to be advantageous if the process is carried out if at least 50% of the possible mechanical power output of the internal combustion engine is delivered to the heat pump or to the electric generator. This is because in such a case the exhaust gas has a smaller percentage of oxygen, so that the soot deposits burn off more slowly upon reaching the temperatures resulting from heating by the exhaust gas, because it has been shown that with very heavy soot deposits and when carrying out the process when the motor is idling, i.e. without, or without a significant, mechanical power output to the heat pump or to an electric generator, the exhaust gas contains such a high percentage of oxygen that heavy soot deposits on the heat exchanger surfaces burn out completely so that the heavy exchanger is heated to a high temperature during the cleaning process.

In the process of the invention, if a heat exchanger is used with a liquid secondary heat transfer medium, particularly water, it is important that the heat exchanger be cooled down to a temperature below the boiling point of the liquid secondary heat transfer medium after heating and the cleaning: in the case of water, the temperature is below 100° C.

The easiest way to do this is to allow the heat exchanger to cool by itself to an appropriate temperature below 100° C. after heating by switching off the internal combustion engine, i.e. during plant shutdown. However, there are also cases when such switching off of the internal combustion engine, i.e. work stoppage, is not possible. Therefore, according to a further preferred embodiment of the process incorporating the invention, if a heat exchanger uses a liquid secondary heat transfer medium, after completion of heating and prior to the refilling of the heat transfer medium, air, or air together with exhaust gas, is injected into the secondary heat circuit, so that adequate cooling can be achieved, particularly if the plant is operated with a low mechanical power output, e.g. with less than 50% of the maximally possible mechanical power output. Further, if water is used as a liquid heat transfer medium, i.e. one that is available in practically unlimited quantities, a very slow refill of the heat exchanger is possible so that the excess heat stored in the heat exchanger is eliminated by evaporating part of the water during refill. This evaporated water issues through the opening which must in any case be provided during heating of a heat exchanger for a liquid medium in order to enable residues of this liquid medium to evaporate during heating to prevent without fail the build-up of excessive pressure on the secondary side of the heat exchanger. The refill of the water leads to rapid cooling of the hot surfaces, with the result that encrustations adhering thereto are worked loose. When using a gas/exhaust gas heat exchanger, it is also necessary during heating and cleaning, that is when the circulation of the gaseous secondary heat transfer medium is stopped, to keep the secondary side of the heat exchanger open with respect to the atmosphere to prevent buildup of excess pressure.

In the operating mode described above that uses a liquid/exhaust gas heat exchanger, prior to heating the heat exchanger by the hot exhaust gases for the cleaning thereof, the heat exchanger is emptied by opening further valves on the heat exchanger simultaneously with the closing of the circulation valves for the liquid secondary heat transfer medium in order to discharge the liquid secondary heat transfer medium into a storage tank. The heat exchanger so emptied on the secondary side is then heated by the hot exhaust gases to the temperature necessary for cleaning. This operating mode calls for extra valves for the emptying of the heat exchanger as well as for additional operating procedures for the operation of these valves.

It has been found that in order to empty the heat exchanger, it suffices that either the upper circulation valve or both circulation valves for the liquid secondary heat transfer medium be closed, provided a balance tank for the liquid secondary heat transfer medium is provided in the heat exchanger which is cut off from the circulation. If the overall system has a balance tank that is adequate for the liquid secondary heat transfer medium, i.e. a heating plant, and only the upper circulation valve on the heat exchanger is closed, there is no need for a separate balance tank, provided this tank, which is normally provided anyway, has a sufficient capacity to absorb the volume of the liquid secondary heat transfer medium that is forced out of the heat exchanger. Due to the retention of the heat from the heat exchanger resulting from the stoppage of the circulation by the closing of the circulation valves, the liquid secondary heat transfer medium in the heat exchanger heats up and starts to evaporate at the appropriate temperature, and said evaporation temperature can be increased slightly with respect to the boiling temperature at the prevailing normal pressure (atmospheric pressure) by a possible hydrostatic pressure brought about by the balance tank. Since, as a result of the hot exhaust gases with a temperature on the order of magnitude between 600° and 650° C., the evaporation temperature of the secondary heat transfer medium, usually water, is far exceeded, a vapor cushion is formed above the still-liquid secondary transfer medium in this closed heat exchanger as the temperature increases, by means of which the liquid secondary heat transfer medium is forced completely or almost completely out of the heat exchanger, so that the latter can be heated to the temperature needed for cleaning by the hot exhaust gases, e.g. on the order of 600° to 650° C. Upon completion of the cleaning operation, which usually takes place in the manner described above, it is necessary to cool the hot heat exchanger down again. To that end, the hot exhaust gases must be kept away from the heat exchanger, for which purpose they are passed through a second heat exchanger whose circulation valves are opened and in which the heat delivered to the heat exchanger by the exhaust gases is dissipated. It has been found that after cutting off the hot exhaust gases from the first heat exchanger after the latter has cooled down, the secondary side of the heat exchanger is completely filled with liquid secondary heat transfer medium so that, after the cooling and the filling of the secondary chamber of the heat exchanger, the upper circulation valve or both circulation valves can once again be opened. After the opening of the circulation valve(s), this heat exchanger can again be charged with hot exhaust gases. Therefore, a prerequisite for carrying out this process of the invention is that there be at least two heat exchangers and, if necessary, a balance tank for the liquid secondary heat transfer medium. After the second heat exchanger has become contaminated, the operating mode described earlier for the first heat exchanger is applied thereto, i.e. this second heat exchanger, by closing the upper circulation valve or both circulation valves for the liquid second heat transfer medium, is shut off from the circulation and heats up, the hot exhaust gases being switched to the first heat exchanger after the cleaning of the second heat exchanger.

It has been found that it is also possible to provide two heat exchangers and, if necessary, a balance tank for the liquid second heat transfer medium, with the hot exhaust gases being passed with alternating direction of flow through the serially connected heat exchangers. To empty the first heat exchanger, its upper circulation valve, or both its circulation valves are closed for the liquid heat transfer medium, and the second heat transfer medium, after heating and evaporation, is forced in the manner described above from this heat exchanger which, when viewed in the direction of flow, is the first heat exchanger, into the balance tank. After the heat exchanger has been heated by the hot exhaust gases and after the cleaning of its heat exchanging surfaces, the hot exhaust gases are switched to the second heat exchanger and they transfer heat therein whereby, of course, in this second heat exchanger the circulation valves for the liquid heat transfer medium are opened. This again results in the cooling of the hot first heat exchanger and in the filling of its secondary chamber with the liquid secondary transfer medium, so that subsequently the upper circulation valve, or both circulation valves, of this heat exchanger can again be opened.

Advantageously, in this embodiment of the process of the invention, there can be mounted between the two serially connected heat exchangers a cyclone separator that can be switched over depending upon the direction of flow. During the heating of the heat exchanger located first in the direction of flow and during its cleaning, both condensate, particularly oil condensate from a diesel engine, and soot particles emerge from said first heat exchanger which could be deposited in the second heat exchanger which, as mentioned earlier, is at a lower temperature, if no soot separator were interposed. This could lead to the clogging of the heat exchanger over time and could in any case necessitate a premature cleaning of the second heat exchanger.

BRIEF DESCRIPTION OF THE DRAWINGS

The invention will now be described in greater detail with reference to the drawings, in which:

FIG. 3 is a schematic representation of the process of the invention with serially connected heat exchangers.

EXAMPLES OF OPERATION

Figure 1:
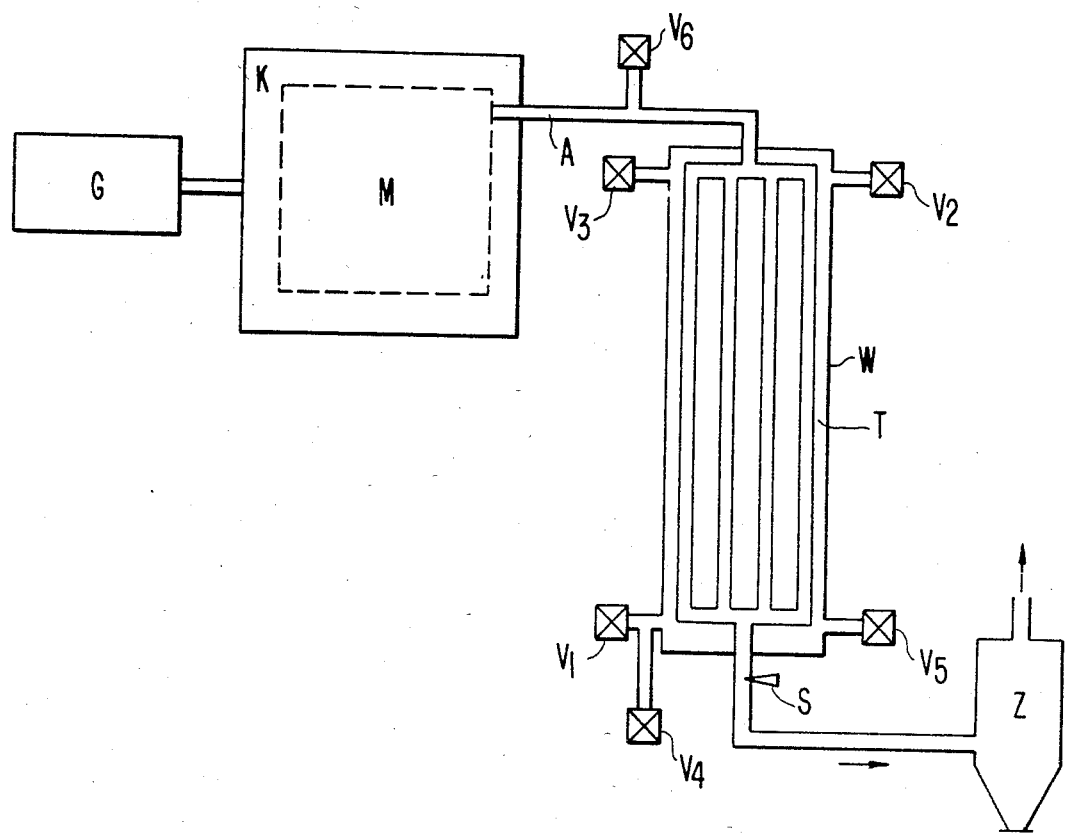
FIG. 1 is a schematic representation of a first embodiment of the process of the invention.

In FIG. 1, M denotes an internal combustion engine, in this case a diesel engine, whose water cooling system is indicated by K. The heat generated in this water cooling system is also used for heating purposes in a manner not discussed in detail. This engine drives via a shaft an electric generator G, whose current can either be shunted to the network or used to operate electrical devices. The exhaust gases escape from the engine through a line A and enter a heat exchanger denoted by W. In this case, this heat exchanger is represented as a shell and tube heat exchanger, four heat exchanging tubes being shown in the drawing. The cooled exhaust gases, that have transferred within the heat exchanger most of the heat contained in the exhaust gases to a liquid secondary heat transfer medium T, emerge at the lower portion of the heat exchanger W. In the present case, there is provided in this discharge pipe a probe S to measure the temperature of the exhaust gases issuing from the heat exchanger W, as well as a cyclone separator Z, which will be described hereinafter. In the lower portion of the heat exchanger W are provided a plurality of connections and associated shutoff valves V1, V4 and V5, and in the upper portion of the heat exchanger are provided two other discharge pipes with shutoff valves denoted by V2 and V3. There is also provided in the exhaust gas line A conducting the exhaust gases from the engine M to the heat exchanger W a branch pipe with a valve V6.

The process of the invention is carried out in such a way that depending on the circumstances, that is to say, in accordance with a predetermined operating time or with an excessive rise of the temperature measured by the probe S in the exhaust gas issuing from the heat exchanger W or with specified operating periods, the valves V1 and V2 arranged in the cooling-water circuit of the heat exchanger W, i.e. in its liquid secondary heat transfer medium, are closed. At the same time, the valves V4 and V3 are oppened, so that the water in the heat exchanger W is discharged to a storage tank, not shown. The secondary side of the heat exchanger W is now devoid of heat transfer medium, i.e. cooling liquid, so that the heat exchanger W, which is usually insulated to avoid heat losses to the atmosphere, is heated very rapidly by the exhaust gases from the engine. A sufficient temperature rise can be detected by the probe S, to determine whether a temperature has been reached that is sufficient for the cleaning of the heat exchanger areas (this temperature can be fixed by simple preliminary tests), or whether the heat exchanger has been heated by these hot exhaust gases to the maximum temperature possible. This maximum temperature can also be determined by a simple preliminary test. During this heating process, the valve V3 must always be open in order to avoid any overpressure in the secondary side of the heat exchanger W.

After the heat exchanger has been heated sufficiently, it must be cooled prior to refilling with the heat transfer medium, in this case water. This can be done by switching off the engine M and slowly cooling the heat exchanger by the unavoidable heat losses. This cooling can also be accelerated by injecting, with the valves V5 and V3 open, a current of cooling air through the secondary side of the heat exchanger. Furthermore, a more rapid cooling of the heat exchanger can be achieved by injecting air through the valve V6 on the exhaust side. If it is not possible to switch off the engine M, i.e. to shut down the plant, the heat exchanger can be cooled sufficiently by a heavy injection of air through the valve V5 on the secondary side and/or through the valve V6 into the exhaust pipe. However, in such a case it is advisable to refill the heat exchanger very slowly with the heat transfer medium, i.e. water in this case, and with the valve V3 open. If the temperature of the heat exchanger is still above 100° C., some of the water that has been filled will be discharged as vapor into the atmosphere through the valve V3 or through a suitable condensing system, so that the heat exchanger can be cooled relatively quickly by the high evaporation heat of the water. After the heat exchanger has been filled with heat transfer medium, i.e. water, the valve V3 can be closed and the valves V1 and V2 can be opened to reactivate the heat exchange circuit. The heat exchanger can also be refilled slowly. In a test plant, a diesel motor with a capacity of 5,500 cm$^3$ was operated by a mixture of heating oil and used oil. The used oil was appropriately processed by means of filters to enable proper operation. The motor had a water cooling system and drove an internal pole synchronous generator with a power output of 7 kVA. The exhaust gas heat exchanger was a vertical shell and tube heat exchanger that was operated with water as secondary heat transfer medium and had a height of approximately 2 meters and a diameter of 22 cm. The heat exchanger was made of steel since the use of steel is advantageous because in some cases the heat exchanger can reach temperatures of 600° to 650° C. during heating. The bundle of tubes of the heat exchanger consisted of 25 steel tubes with a 2.7 cm outside diameter. The heat exchanger was connected to the tank of a hot water heating system with a flow temperature on the order of 50° C., the water-discharge temperature was approximately 70° C., but this was dependent upon the engine load. After approximately 300 working hours, the water circuit of the heat exchanger was switched off and the water contained therein was run into a container. Then, with the valve V3 open, the heat exchanger surfaces were heated for about an hour, which resulted in temperatures up to 600° to 650° C. so that the heat exchanger was first dried off completely, and then it automatically cleansed itself of soot. During such process, some of the deposits were burned out, and some were carried off by the exhaust gas and could be deposited in a soot arrester. The remaining volatile or vaporizable constituents were exhausted to atmosphere with the exhaust gas, but necessary, they can also be collected and washed out in an appropriate cleaning plant.

Using prior art control and measuring instruments not described in detail herein, such as elapsed-time meters or temperature recording probes, suitable control valves and a preprogrammed control unit, the process of the invention can be carried out automatically at predetermined times or operating conditions, so that no maintenance work need be carried out which, particularly for small plants, results in considerable savings.

The process of the invention can also be carried out in dependence upon backflow of the exhaust gases in the heat exchanger or upon the pressure loss in the heat exchanger, that is to say, when these measured quantities reach previously set, freely selectable values that have been determined by preliminary tests; the process is triggered and carried out by an automatic control unit.

During heating, particle-shaped deposits in the heat exchanger, which could pollute the environment because they are entrained by the hot exhaust gases, are set free. It has been found useful to install downstream of the heat exchanger a cyclone separator which operates practically without pressure loss and in which, even during the normal operation of the heat exchanger, some of the soot particles contained in the exhaust gases are precipitated.

Figure 2:
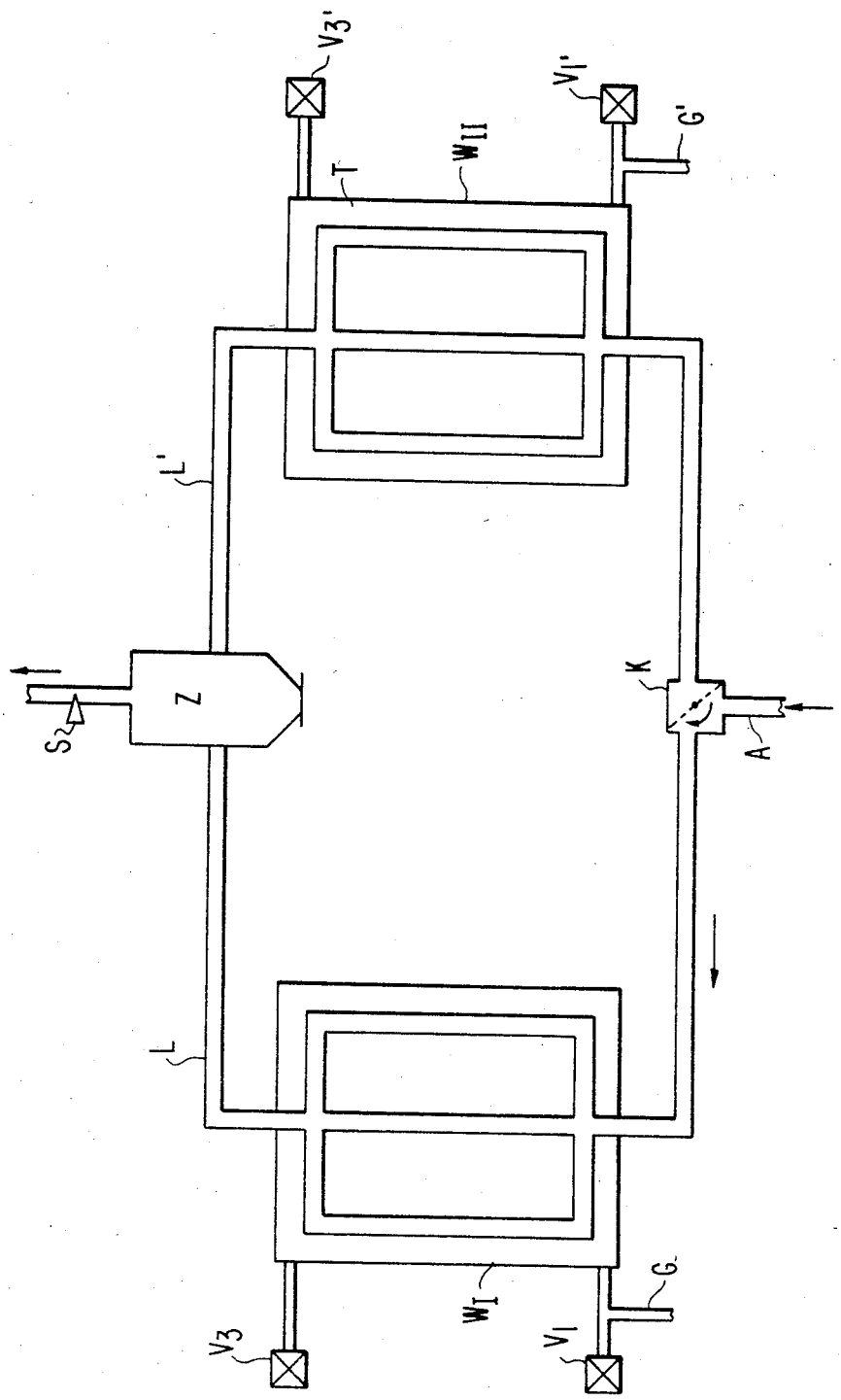
FIG. 2 is a schematic representation of a embodiment of the process of the invention with parallel connected heat exchangers that can be alternately selected.

In FIG. 2, exhaust gases from an internal combustion engine, not shown, pass through the exhaust pipe A to a control flap valve K controlling the routing of the hot exhaust gases to heat exchangers WI or WII. The heat exchangers WI and WII are each provided with at least upper valves V3 or V'3, and preferably also with lower valves V1 or V'1, respectively, in order to switch off the heat transfer medium T. Usually, this heat transfer medium is water, as used in central heating systems. In the present case, the heat exchangers WI and WII are shown as shell and tube heat exchangers. In the operating condition depicted in FIG. 2, the hot exhaust gases first enter the heat exchanger WI through the flap valve K, and during passage through heat exchanger WI deliver their thermal energy to the heating system via the heat transfer medium circulating through the open valves V1 and V3. The cooled exhaust gases are then passed at the upper end of the heat exchanger WI via the exhaust pipe L to an cyclone separator Z in which, during normal operation, soot particles can be deposited. Further, there is provided either in the exhaust pipe L or in the discharge pipe from the cyclone soot separator Z a probe S used to measure the temperature of the exhaust gases issuing from the heat exchanger. Compensating pipes G or G' are provided and, if necessary, a balance tank (not shown) that has a sufficient capacity to receive the heat transfer medium supplied by emptying one of the heat exchangers. However, if the heating system has a balance tank with an adequate capacity, the compensating pipes G or G' and the extra balance tank can be dispensed with.

If the heat exchanger WI becomes soiled, at least the upper valve V3 is closed, so that the circulation of the heat transfer medium in the heat exchanger WI is stopped. The heat exchanger is heated progressively by the hot exhaust gases from the bottom to the top and after the boiling point of the heat transfer medium has been exceeded, the latter evaporates and forces through the developing vapor cushion the liquid heat transfer medium from the heat exchanger W1 to the balance tank. If separate compensating pipes G and G1 and an extra balance tank are present, the lower valve V1 can also be closed. After switching off the circulation, i.e. with the valve V3 closed, the heat exchanger WI is heated progressively by the hot exhaust gases to a temperature that is sufficient for the cleaning operation, usually 600° to 650° C., during which process settlings and deposits of soot on the heat exchanging areas, i.e. within the bundle of tubes, are burned off or worked loose, then passed to the cyclone soot separator Z through the exhaust pipe L. The probe S is used to determine whether a sufficient temperature is reached in the heat exchanger WI. After the heat exchanger WI has been cleaned, the control flap valve K is reversed so that the hot exhaust gases are now passed through the clean heat exchanger WII to deliver their heat to the heat transfer medium T therein, with the valves V'1 and V'3 open. The hot exhaust gases then enter the cyclone separator through the exhaust pipe L'. As the hot exhaust gases are passed through the heat exchanger WII and deliver therein their heat to the heat transfer medium, i.e. the heating system, the heat exchanger WI has sufficient time to cool down by itself by temperature equalization with the ambient air, and when the temperature falls below the boiling temperature of the heat transfer medium, i.e. 100° C. in the case of water, the heat transfer medium can again enter the heat exchanger WI from below and can progressively refill the heat exchanger completely. As soon as the heat exchanger WII becomes soiled and has to be cleaned, at least the upper valve V'3 is closed and the cleaning process as described earlier with reference to the heat exchanger WI is now applied to heat exchanger WII, after which the heat exchanger WI, with the valves V1 and V3 open, is available as a heat exchanger for the heating system.

In the embodiment depicted in FIG. 3, the two heat exchangers are connected in series. In FIG. 3, the parts of the system used for the process of the invention are given the same reference numerals as those of the device illustrated in FIG. 2.

The hot exhaust gases are first conducted to the heat exchanger WI through the exhaust pipe G via the control flap valve K. After passing through this heat exchanger and delivering heat to the circulating heat transfer medium when the valves V1 and V3 are open, the gases are conducted through a cyclone separator Z in order to precipitate any soot particles that may still be entrained by the exhaust gases, and after cyclone separator Z the gases are conducted to the heat exchanger WII through the pipe L'.

As soon as the heat exchanger WI becomes soiled and has to be cleaned, at least the upper valve V3 is closed, but with the valves V'3 and V'1 of the heat exchanger WII open. By progressive heating of the heat exchanger WI, once the boiling point of the heat transfer medium is exceeded, the heat transfer medium is forced out of the heat exchanger WI, either with the valve V1 open into the compensating system of the heating system, or with the valve V1 closed through the separate compensating line G into a separate balance tank, not shown. Since in this heating process the hot exhaust gases do not transfer all of their thermal energy to the heat exchanger WI for the cleaning thereof, the residual thermal energy of the exhaust gases emerging from the heat exchanger WI or from the cyclone separator Z can still be utilized in the heat exchanger WII which is connected to the heating plant. After emerging from the heat exchanger WII, the cooled exhaust gases can also be conducted through a second cyclone separator Z' in order to precipitate without fail any impurities contained therein, such as soot particles, etc. so as to avoid polluting the environment.

In the embodiment illustrated in FIG. 3, the control flap valve K is so designed that it simultaneously controls the conduction of the hot exhaust gas from the exhaust pipe A to the heat exchanger to be charged first and the conduction of the cooled exhaust gases escaping from the second heat exchanger to the cyclone separator Z'. A flap valve K' synchronously controlled for this purpose produces the correct flow through the cyclone separator Z. After the heat exchanger WI—as described in this case—has been sufficiently heated and cleaned by the hot exhaust gases after cutting off the transfer medium T from circulation, the control flap valve K is reversed so that now the hot exhaust gases first enter the heat exchanger WII from the exhaust pipe A and deliver therein their heat and, subsequently, after passing through the cyclone soot separator Z, they once again cool down the heat exchanger WI so that the latter, after its temperature drops below the boiling point of the heat transfer medium, i.e. usually about 100 C. in the case of water, is refilled with heat transfer medium. Thereupon, the valve V3 and, if necessary, the valve V1 can be reopened in order to restore the circulation of the heat transfer medium in the heat exchanger WI. As soon as the heat exchanger WII becomes soiled, at least the upper valve V3 is closed and the cleaning process as described earlier with reference to the heat exchanger WI is applied thereto. The advantage of the embodiment depicted in FIG. 3 is seen in the fact that some of the heat of the hot exhaust gases during the cleaning period for one heat exchanger can still be used in the second heat exchanger for heating purposes, whereas in the embodiment illustrated in FIG. 2 during the cleaning period the hot exhaust gases cannot deliver heat to the heating system until the cleaning process is completed.

The process incorporating the invention can also be carried out by automatic control when applied to the embodiments described with reference to FIGS. 2 and 3, i.e. depending upon the backflow of the exhaust gases in one of the heat exchangers, or upon the loss of pressure in one of the heat exchangers, i.e. when these measured values increase to prespecified freely selectable values determined by preliminary tests, the process of the invention is triggered and carried out by automatic control units. This is possible by using suitable control and measuring instruments known from the prior art and not described in detail herein. In this case, too, specific operating times for the temperature rise determined by the temperature-sensing probes S can be used as measured values. Thus, automatic operation is possible by using suitable control valves, so that no maintenance work is needed, and this leads to lower operating costs for small plants.

During heating, particle-shaped deposits that could pollute the environment because they are entrained by the hot exhaust gases are set free from the walls of the heat exchanger. Therefore, when carrying out the process of the invention, it is advisable to install the cyclone soot separator depicted in the figures and described with reference thereto, or even two cyclone soot separators in which even during normal operation of the heat exchangers, i.e. when the heat is delivered to the heating system, at least most of the soot particles are precipitated out of the exhaust gases. This is particularly advisable if diesel engines are used in the stationary plants for the operation of heat pumps or for the combined generation of current and heat.

Figure 4:
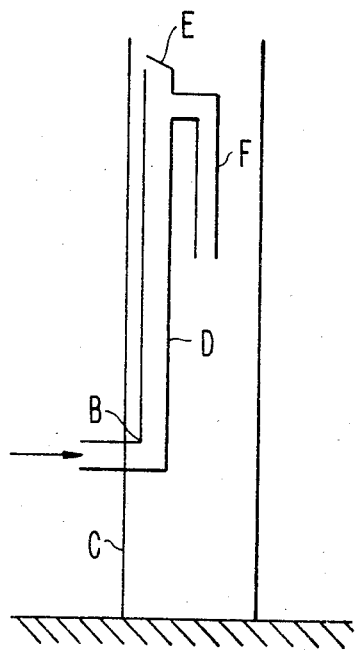
FIG. 4 is a schematic representation of a pipe soot separator for the process of the invention.

FIG. 4 is a schematic representation of a tubular soot separator that has proved useful when implementing the process of the invention according to the embodiments illustrated in FIGS. 1 and 2. This soot separator comprises an outer tube C, e.g. with a diameter of 30 cm, into which an inner tube D is inserted. The exhaust gases are conducted into the pipe D at B. At the upper end, the tube D supports a hinged lid E which is open during normal operation, so that the exhaust gases, after issuing from the heat exchanger, can be exhausted to atmosphere. After starting the heating of the heat exchanger, the hinged lid E is closed and the increasingly hotter exhaust ases enter a downwardly directed tube F which is open at the bottom. Upon exiting from this tube F, the gases are once again reversed and exit from the gap between the outer tube C and the tubes D and F to be discharged into the atmosphere. Due to gravity and to this reversal, the heavier soot particles are deposited in the lower portion of the tube C, from where they can be withdrawn periodically. The outer tube C can be 5 to 10 meters long and the diameters of the tubes D and F are preferably 10 to 8 cm, while the tube F can be 1 to 2 meters long.

In the embodiment of the process of the invention in which the exhaust gases are conducted through serially connected heat exchangers and a separator, more particularly a cyclone separator, is provided between these heat exchangers, it has proved to be advantageous to provide, downstream of the soot separator and upstream of the heat exchanger which, in the direction of flow, is second, a heating unit through which the exhaust gases are passed. When the heat exchanger that is first when viewed in the direction of flow is heated by stopping the circulation of the secondary heat transfer medium, any oil vapors will evaporate from its secondary-side surfaces that are not removed in the soot separator and that could again be condensed on the cold heat exchanger surfaces. Therefore, the heating unit, which preferably consists of electrically heated rods, is cut in during the cleaning operation so that oil vapors that are driven out of the first heat exchanger burn off on the hot heating rods which have a temperature above 750° C. and cannot condense again on the cold heat exchanger surfaces of the downstream heat exchanger. In the plant described earlier that has a diesel engine of 5,500 cm$^3$capacity, the electrical power of the heating rods was 12 kW. In the second, downstream heat exchanger the heat emitted by the heating rods is fully recovered for heating purposes, so that no losses occur due to the removal of the oil vapors by combustion or oxidation.

What is claimed is:

1. In a process comprising cooling the exhaust gases from an internal combustion engine of a stationary installation by use of a heat exchanger having conudit walls, wherein said exhaust gases are passed in direct contact with a first surface of each said wall and a heat transfer medium is circulated past the opposite second surface of each said wall in direct contact therewith, thereby transferrring heat from said exhaust gases through said walls to said heat transfer medium, the improvement comprising removing from said first surfaces of said conduit walls sediment and condensate deposited thereon from said exhaust gases, said removing comprising:

interrupting said circulation of said heat transfer medium in direct contact with said second surfaces of said conduit walls, such that said transfer of heat from said exhaust gases to said heat transfer medium is interrupted; and thereby transferring said heat from said exhaust gases to said conduit walls and thus heating said conduit walls to a temperature sufficient to burn said sediment and condensate from said first surfaces;

2. The improvement claimed in claim 1, comprising interrupting said circulation periodically and automatically at predetermined time intervals.

3. The improvement claimed in claim 1, comprising interrupting said circulation automatically at predetermined times of operation of said internal combustion engine.

4. The improvement claimed in claim 1, comprising interrupting said circulation automatically upon the detection that the temperature of said exhaust gases issuing from said heat exchanger has reached a predetermined temperature.

5. The improvement claimed in claim 1, comprising interrupting said circulation automatically at time periods of high demand for the mechanical power output of said internal combustion engine and low demand for heat transferred to said heat transfer medium.

6. The improvement claimed in claim 1, comprising interrupting said circulation when said internal combustion engine is delivering at least 50% of its possible mechanical power output.

7. The improvement claimed in claim 1, wherein said heat transfer medium comprises a liquid, and said interrupting comprises emptying said liquid heat transfer medium from said heat exchanger.

8. The improvement claimed in claim 7, further comprising, after emptying said liquid heat transfer medium and said heating said conduit walls, cooling said heat exchanger, and then refilling said heat exchanger with said liquid heat transfer medium.

9. The improvement claimed in claim 8, wherein said cooling said heat exchanger comprises injecting a cooling substance into said heat exchanger.

10. The improvement claimed in claim 8, wherein said cooling said heat exchanger comprises injecting a cooling substance into said exhaust gases supplied to said heat exchanger.

11. The improvement claimed in claim 1, wherein said heat transfer medium comprises a gas, and said interrupting comprises stopping movement of said gas heat transfer medium.

12. The improvement claimed in claim 1, further comprising passing said exhaust gases, after passage thereof through said heat exchanger, through a cyclone soot separator.

13. The improvement claimed in claim 1, comprising providing two said heat exchangers connected in parallel, said heat transfer medium comprises a liquid, said circulating comprises passing said liquid heat transfer medium upwardly through one said heat exchanger by means of upper and lower circulation valves, said interrupting comprises closing said upper circulation valve of said one heat exchanger, thereby heating and evaporating said liquid heat transfer medium and forcing it from said one heat exchanger, and further comprising, after removing said sediment and condensate from said one heat exchanger, transferring the passage of said exhaust gases to be cooled to the other said heat exchanger and therein cooling said exhaust gases, while cooling said one heat exchanger.

14. The improvement claimed in claim 1, comprising providing two said heat exchangers connected in series and passing said exhaust gases serially through both said heat exchangers for cooling said exhaust gases, said heat transfer medium comprises a liquid, said circulating comprises passing said liquid heat transfer medium upwardly through both said heat exchangers by means of respective upper and lower circulation valves, said interrupting comprises closing said upper circulation valve of the upstream first said heat exchanger, thereby heating and evaporating said liquid heat transfer medium therein and forcing it from said first heat exchanger, and further comprising, after removing said sediment and condensate from said first heat exchanger, reversing the direction of the passage of said exhaust gases to be cooled such that said exhaust gases pass initially through the second said heat exchanger and then through said first heat exchanger, thereby cooling said first heat exchanger.

15. The improvement claimed in claim 14, further comprising passing said exhaust gases through a soot separator located between said two heat exchangers.

16. The improvement claimed in claim 15, further comprising heating said exhaust gases after passage thereof through said soot separator and before the passage thereof into the downstream said heat exchanger.

17. The improvement claimed in claim 1, comprising heating said conduit walls to a temperature of approximately 600°–650° C.

* * * * *